Sept. 11, 1956  H. S. SECHRIST ET AL  2,762,964
REGULATING CONTROL SYSTEM
Filed Dec. 14, 1953  2 Sheets-Sheet 1

Inventors:
Harry S. Sechrist,
William A. Hunter,
by Irving H. Marshman
Their Attorney.

Sept. 11, 1956  H. S. SECHRIST ET AL  2,762,964
REGULATING CONTROL SYSTEM
Filed Dec. 14, 1953  2 Sheets-Sheet 2

Inventors:
Harry S. Sechrist,
William A. Hunter,
by Irving H. Marshman
Their Attorney.

United States Patent Office 2,762,964
Patented Sept. 11, 1956

2,762,964
REGULATING CONTROL SYSTEM

Harry S. Sechrist and William A. Hunter, Schenectady, N. Y., assignors to General Electric Company, a corporation of New York Application December 14, 1953, Serial No. 398,061

12 Claims. (Cl. 322—68)

This invention relates to regulating systems in which an electrical error signal voltage equal to the difference between an electrical reference quantity and an electrical signal quantity which is proportional to a quantity to be regulated is amplified, and the amplified error signal is utilized to reduce the error to a minimum, and an object of the invention is the provision of a simple, reliable and improved regulating system of this character.

A more specific object of the invention is the provision of a regulating system of this character in which "overshooting" or "hunting" is greatly reduced.

A still more specific object of the invention is the provision in an electrical regulating system in which hunting is minimized by means of a controllable degenerative feedback circuit for inserting a "dead band" or region of relatively low sensitivity in the error input v. output characteristic of the system.

In carrying the invention into effect in one form thereof an amplifying device for use in a regulating system is provided with an output circuit and an input circuit for controlling the magnitude of an electrical quantity of the output circuit or of an electrical quantity of the system which is controlled by the output circuit. It is provided with a degenerative feedback control circuit from the output circuit to the input circuit for effecting a relatively low gain between an electrical quantity of the input circuit and the controlled quantity of the output circuit throughout a range of relatively low values of the input and output quantities. The amplifier is also provided with means for limiting the effect of the degenerative circuit to a predetermined but adjustable range thereby to effect a relatively high gain between the input and output quantities throughout an adjoining range of relatively higher values of such quantities. This means takes the form of a source of reference voltage, a connection from a predetermined point of the degenerative circuit to a corresponding point of the reference voltage source and a rectifier in such connection which is poled to become conducting when the voltage at such predetermined point equals or very slightly exceeds the voltage of the corresponding point of the reference voltage source.

Figure 1:
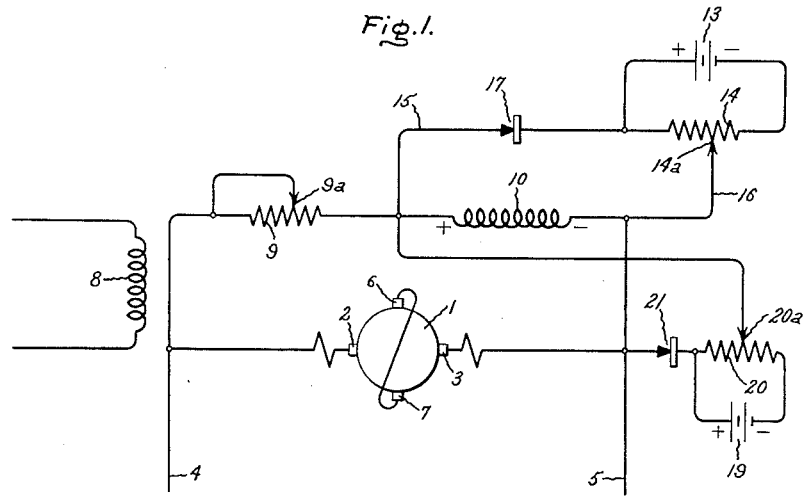
Figure 4:
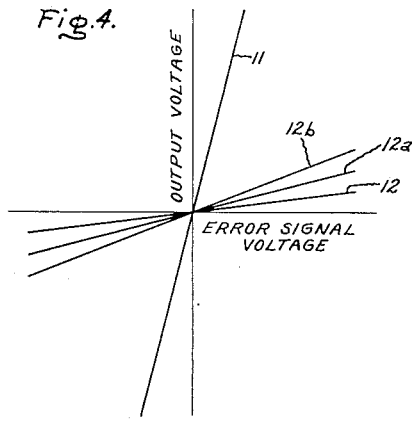
Figure 5:
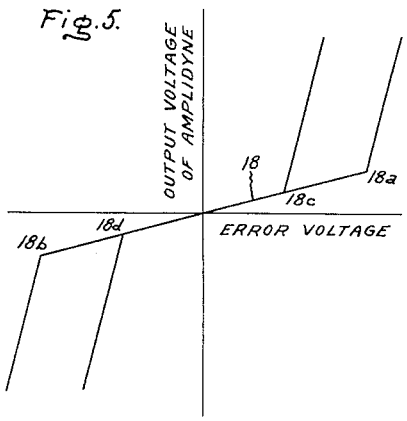
Figure 6:
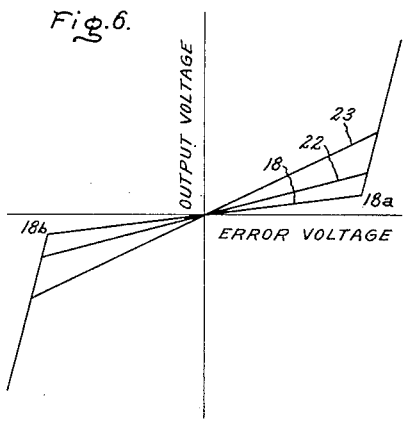
Figure 2:
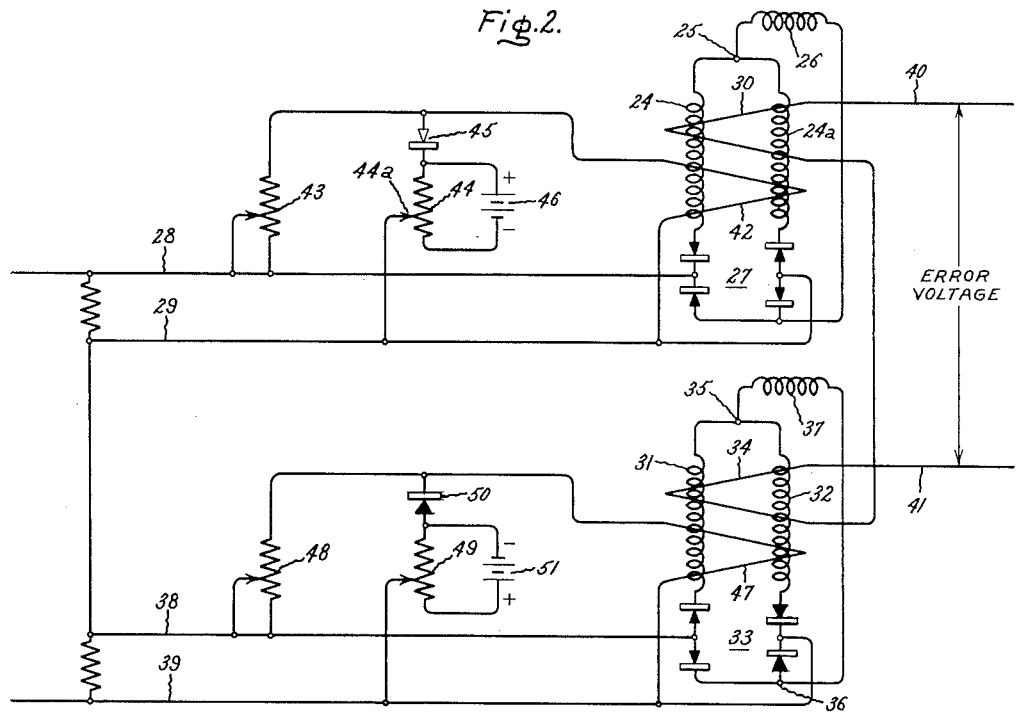
Figure 3:
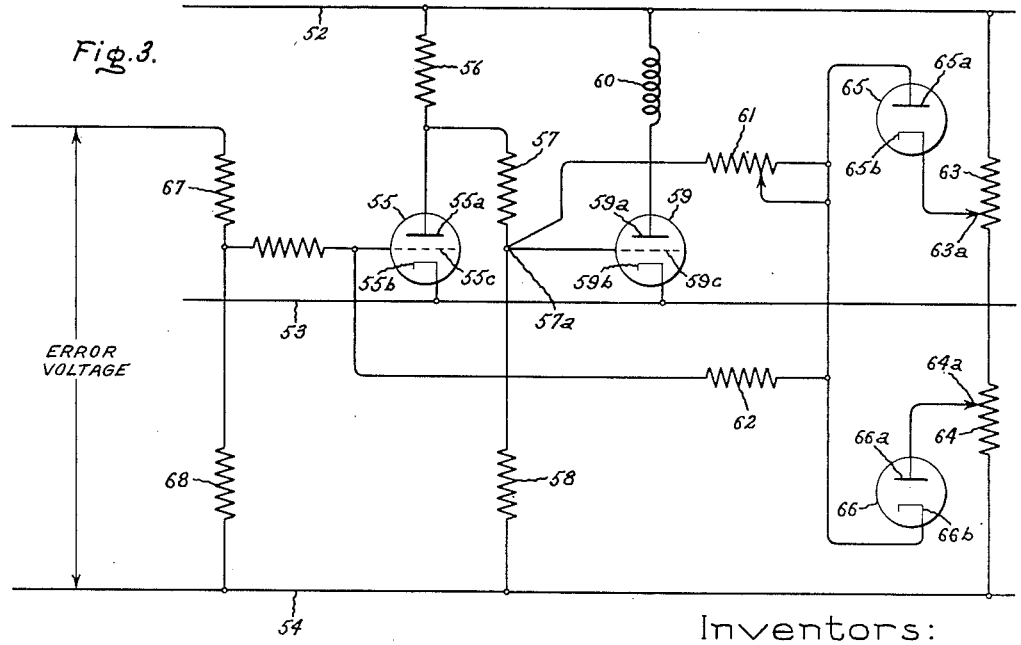

For a better and more complete understanding of the invention, reference should now be had to the following specification and to the accompanying drawing of which Fig. 1 is a simple, diagrammatical sketch of an embodiment of the invention in which the amplifier is in the form of an amplidyne, Fig. 2 is a simple, diagrammatical sketch of a modification of the invention in which the amplifier is in the form of a push-pull connected magnetic amplifier, Fig. 3 is a simple, schematic diagram of a modification in which the amplifier is a two stage electronic amplifier and Figs. 4, 5 and 6 are curves of amplifier operating characteristics which facilitate an understanding of the invention.

Referring now to the drawing, and particularly to Fig. 1, an amplifier for use in a regulating system is illustrated as comprising an armature reaction excited regulating dynamoelectric machine 1 which is known to industry as an amplidyne. Its armature is provided with two sets of brushes arranged in quadrature. The first set comprises brushes 2 and 3 which are arranged on the main or load axis of the armature and supply a voltage to an output circuit which is represented conventionally by conductors 4 and 5. The load which is supplied from the conductors 4 and 5 may be any kind of electrical translating device such for example as an electric motor, the field winding of a generator or the saturation control winding of a magnetic amplifier. Mounted on an axis at right angles electrically to the main load axis is a second pair of brushes 6 and 7. This pair of brushes is short circuited and the large armature reaction current which flows in the short circuit produces the main operating flux which in turn produces the voltage that appears at the load brushes 2 and 3. Current is caused to flow in the short circuit by means of a control flux which is produced by means of a control field winding 8 to which a voltage is supplied from a suitable source. When used in a regulating system, there is supplied to this control field winding an error voltage which is equal to the difference between a reference voltage and a control voltage which is derived from and is proportional to the magnitude of a characteristic or quantity which is to be regulated. The amplidyne 1 is driven by any suitable driving means (not shown) at a speed which is preferably substantially constant.

Owing to the relatively low time constants of its circuits and its exceptionally high speed of response and high amplification factor the amplidyne is well adapted for use as the amplifier of a regulating system. For example a conventional amplidyne can be made to change its output by 20,000 watts within $\frac{1}{60}$ second in response to a change of 1 watt in its input circuit. An amplidyne having such high gain or sensitivity tends to make the system in which it is used as an amplifier unstable and to produce hunting or oscillation.

For the purpose of substantially reducing or entirely eliminating such hunting, means are provided for inserting a "dead band" in its output v. input characteristic. This is accomplished by the provision of a feedback means for modifying the characteristic so that it has a relatively low gain or sensitivity over a predetermined range of relatively low values of the input circuit error signal and the controlled or regulated quantity of the output circuit, and has a relatively high gain throughout an adjoining range of relatively high values. This feedback means is illustrated as a degenerative feedback circuit which comprises an adjustable resistor 9 and a degenerative field winding 10 connected in series relationship with each other across the output terminals 2 and 3 of the amplidyne. The degenerative field winding is poled so that its magnetomotive force opposes the magnetomotive force of the input control winding 8.

In the absence of the degenerative feedback circuit, the relationship between the error signal supplied to the input circuit and the output circuit terminal voltage is linear as represented by the linear curve 11 in Fig. 4 of which ordinates represent output voltage and abscissae represent units of the error signal quantity which may be either voltage or current but which for the purpose of illustration is assumed to be voltage. The steepness of the curve 11 indicates that the gain of the system is relatively high. In other words the slope of the curve is a measure of the gain of the amplifier.

With the degenerative field connected and energized and with no limit imposed on its effectiveness or the range in which it is operable, the relationship between input circuit volts, or error voltage, and output circuit volts is linear and is represented by the linear curve 12. The relatively low value of the slope of curve 12 indicates that the degenerative circuit is highly effective and has reduced the gain of the amplifier to a relatively low value. Adjustment of the position of the sliding contact 9a to adjust the value of the resistor 9 changes the effectiveness of the feedback circuit. Movement of the slider 9a to increase the effective value of resistor 9 decreases the effectiveness of the feedback circuit thereby decreasing the degeneration of the amplifier and correspondingly increasing its gain as represented by the curve 12a of which the slope is greater than that of curve 12. Thus by varying the position of the sliding contact 9a there is provided a family of curves 12, 12a, 12b etc. each having a different slope and each slope representing a different gain of the amplifier.

For the purpose of providing a relatively low gain throughout a range of relatively low values of the input and output circuit voltages and a relatively high gain throughout an adjoining range of relatively high values of these voltages, means are provided for limiting the effectiveness of the degenerative feedback circuit to such predetermined lower range. This means is illustrated as a source of reference voltage comprising a source of constant direct voltage such as battery 13, an adjustable resistor 14 connected across the terminals of the battery 13 and connections 15 and 16 from terminals of the field winding 10 to corresponding points on the resistor 14. The polarity of the output voltage of the amplidyne is reversible depending on the polarity of the error voltage which is supplied to the control field winding 8. It is assumed that the excitation of winding 8 is of such polarity that the voltage at the load brush 2 is positive and the voltage at load brush 3 is negative. Thus, the voltage at the left-hand terminal of degenerative field winding 10 is positive and the voltage at the right-hand terminal is negative. The right-hand terminal of resistor 14 is connected to the negative terminal of the battery and the left-hand terminal of the resistor is connected to the positive terminal. As a result of these connections, the voltage drop across degenerative field winding 10 is opposed to the voltage across the active portion of resistor 14. A sliding contact 14a serves to adjust the active portion of the resistor so that the voltage drop across the field winding 10 may be compared with any selected fraction of the total voltage across the resistor.

A blocking rectifier 17 preferably of the dry disk type such, for example as a copper oxide or selenium rectifier is included in the connection 15 between the positive terminals of the field winding 10 and the resistor 14 and is poled to block the flow of current from the positive terminal of the resistor 14 to the positive terminal of the field winding 10. Thus, as long as the voltage between the sliding contact 14a and the positive terminal of the resistor 14 exceeds the voltage drop across the field winding 10, no current flows in either direction in connection 15 or 16. However, when the voltage drop across the field winding exceeds, no matter how slightly, the voltage drop across the active portion of the resistor 14 current flows from the positive terminal of the field winding through the rectifier 17, active portion of the resistor and connection 16 to the negative load brush of the amplidyne. Once the rectifier 17 becomes conducting, the positive terminal of the field winding is effectively connected solidly to the positive terminal of the resistor 14 and the voltage drop across the field winding 10 remains approximately equal to the voltage across the active portion of the resistor even though the output voltage of the amplidyne continues to increase. Since the voltage drop across the field winding 10 is thus limited there can be substantially no further increase in the current through the degenerative field winding. Any further increase in the output voltage of the amplidyne results in an increased voltage drop across resistor 9 and any further resulting increase in the current through resistor 9 is shunted around the field winding 10 through the rectifier 17 and battery 13. Consequently there can be no further significant increase in the effect of the degenerative feedback on the output v. input voltage of the characteristic of the amplidyne.

The foregoing operation is illustrated graphically by the portion of the curve 18 to the right of the vertical axis in Fig. 5 of which ordinates represent output voltage of the amplidyne and abscissae represent input or error voltage. In the range of relatively low values of output voltage between zero and the voltage at which the voltage drop across the degenerative field winding 10 becomes equal to the voltage drop across the active portion of the resistor 14, the field winding 10 imposes its degenerative effect on the amplidyne so that the relationship between the input or error voltage and the output voltage is represented by the portion of the curve 18 between 0 and the point 18a. The gain throughout this range is relatively low as indicated by the relatively low value of the slope of this portion of the curve. At the value of output voltage represented by the ordinate of point 18a, the rectifier 17 becomes conductive and consequently there is no further significant increase in the current in the degenerative field winding in response to further increases in the error voltage. As a result, the degenerative effect of field winding 10 is limited approximately to the value existing at the value of voltage drop across the field winding at which the rectifier 17 becomes conductive.

For further increases in the error voltage, the gain between error voltage and output voltage is very nearly the same as if the amplidyne had no degenerative feedback circuit provided the resistance of resistor 14 is relatively low and it is accordingly represented graphically by the portion of the curve 18 to the right of the point 18a which has the same slope as the curve 11 of Fig. 4. The actual value of the slope of this portion of the curve is, however, dependent upon the ratio of the resistances of resistor 14 and the degenerative field winding 10. Consequently, the slope in the relatively high gain region of curve 18 is dependent upon the total resistance of resistor 14 and can be changed by replacing resistor 14 by a resistor of higher or lower resistance value. Thus, throughout a range of relatively low values of the input and output voltages, the gain of the amplifier is relatively low and throughout an adjoining range of relatively high values the gain is relatively higher.

For reverse polarities of the error and output voltages a battery 19, adjustable resistor 20, and rectifier 21 produce a similar result which is represented graphically in Fig. 5 by the portion of the curve 18 to the left of the zero vertical axis.

Adjustment of the position of the sliding contact 14a on the resistor 14 has the effect of moving the position of the point 18a which marks the intersection of the relatively high gain portion of the characteristic with the relatively low gain portion. Thus by moving the sliding contacts 14a and 20a to the left the intersection points 18a and 18b of the high and low gain portions of the characteristic are displaced to points 18c and 18d respectively. In other words, the range of values of output voltage of the low gain portion is decreased and the range of values of the relatively high gain portions of the characteristic are increased. Since each change in position of the sliding contacts 14a and 20a changes the position of the intersection points 18a and 18b, an entire family of characteristic curves may be produced by such movement of the sliding contacts.

The gain of the relatively low gain portion of the characteristic may be changed by varying the position of the sliding contact 9a on the resistor 9. Thus by moving the sliding contact 9a to successive positions to the right on resistor 9, to increase its effective value, the degenerative effect of the field winding is correspondingly reduced. This is indicated by the linear curves 22 and 23 of Fig. 6 of successively increasing slope with respect to the slope of curve 18.

In the modification of Fig. 2, the invention is illustrated as embodied in a magnetic amplifier system. The amplifier is illustrated as a single stage push-pull type. One half of the amplifier comprises a magnetic core member (not shown) upon which are mounted main load circuit reactance windings 24 and 24a. The core may be a three-legged laminated magnetic structure and the windings 24 and 24a are mounted on the outside legs. These windings have a common junction point 25 which is connected to one terminal of a source of alternating voltage supply which in this case is represented by the secondary winding 26 of a supply transformer. Between the terminals of reactance windings 24 and 24a and the opposite terminal of secondary winding 26 is connected a full wave bridge rectifier 27 of which the rectifier in each arm is preferably of the dry surface contact type such for example as a selenium disk or copper oxide rectifier. As a result of the connections and polarities illustrated, a pulsating rectified current flows in the winding 24 during positive half cycles of the supply voltage and a similar pulsating current flows in reactance winding 24a during negative half cycles. A direct voltage appears at the output terminals 28 and 29 of which the magnitude may be varied by means of a saturation control winding 30 preferably mounted on the center leg of the core structure.

The opposite half of the push-pull amplifier which is identical in structure comprises main reactance windings 31 and 32, full wave bridge connected output rectifier 33 and saturation control winding 34. To the common terminal 35 of reactance windings 31 and 32 and to terminal 36 of rectifier 33 an alternating voltage is supplied from a suitable source such as the secondary winding 37 of a transformer. Preferably, windings 26 and 37 are secondary windings of the same transformer. A direct voltage appears at the output terminals 38 and 39 of rectifier 33. Output terminals 29 and 38 of the two halves of the push-pull amplifier are connected together and thus the conductors 28 and 39 become the combined output terminals of the two halves of the push-pull amplifier.

The two saturation control windings 30 and 34 are connected in series relationship to the source of error voltage which is represented by the two conductors 40 and 41.

One half of the push-pull amplifier is provided with a feedback winding 42 which preferably is mounted on the central leg of the core structure on which the windings 24 and 24a and 30 are wound. It is supplied from the output terminals 28 and 29 of rectifier 27 and is poled so that its magnetomotive force opposes the magnetomotive force of saturation control winding 30. Connected in series relationship with feedback winding 42 is a resistor 43 which is made adjustable to adjust the sensitivity of the upper half of the amplifier. In other words it adjusts the slope of the output voltage v. error voltage characteristic. It corresponds to the resistor 9 of the Fig. 1 modification. Across the degenerative feedback winding 42 a resistor 44 and a rectifier 45 are connected in series relationship with each other. As shown, the resistor 44 is connected across a battery 46. It is provided with a sliding contact 44a to adjust the value of output voltage at which the feedback winding is made relatively unresponsive to any further increase in output voltage. In other words it serves to adjust the position of the point of intersection of the low sensitivity and high sensitivity portions of the output voltage v. input voltage characteristic. In this connection, resistor 44, rectifier 45 and battery 46 correspond to resistor 14, rectifier 17 and battery 13 of the Fig. 1 modification and produce a similar operation and similar results.

The other half of the amplifier is provided with a similar degenerative control unit i. e. degenerative feedback winding 47, sensitivity controlling resistor 48, adjustable resistor 49, rectifier 50 and battery 51. These elements correspond respectively to the resistor 9, resistor 20, rectifier 21 and battery 19 of Fig. 1. The overall operation of the Fig. 2 modification is so nearly identical with the operation of the system of the Fig. 1 modification that it will readily be understood from the foregoing description of the operation of Fig. 1. Consequently, a detailed description of the operation, which would be largely repetitious, is omitted.

Since each half of the push-pull amplifier is provided with its own individual independent feedback circuit, and individual and independently adjustable resistors 43 and 48 are included in such circuits, the sensitivities of the relatively low gain portions of the characteristic for both positive and negative polarities of the input and output voltages may be independently adjusted. In other words, by independent adjustment of resistors 43 and 48, the low gain portion of curve 18 between the zero vertical axis and point 18a may be given a different slope from that of the portion between the zero axis and point 18b.

In the modification illustrated in Fig. 3, the invention is illustrated as embodied in a two stage electric valve type amplifier in which the error or input v. output voltage characteristic is provided with regions of relatively low gain and relatively high gain by means of an electric valve degenerative feedback circuit. The amplifier is illustrated as comprising three direct voltage supply conductors 52, 53 and 54. The voltage of conductor 52 is assumed to be positive; the voltage of conductor 54 is assumed to be negative and the voltage of conductor 53 is assumed to be intermediate the voltages of conductors 52 and 54. The voltages between conductors 52 and 53 and between 53 and 54 may be equal.

The first stage of the amplifier comprises an electric valve 55 having an anode 55a, a cathode 55b and a control electrode 55c. The cathode 55b is connected directly to intermediate voltage conductor 53 and the anode 55a is connected through a resistor 56 to the positive supply conductor 52.

Between the anode and the negative conductor 54 two resistors 57 and 58 are connected in series relationship. An electric valve 59 which is connected in a circuit across the positive and intermediate voltage supply conductors 52 and 53 constitutes the second stage of the amplifier. It has an anode 59a, a cathode 59b and a control electrode 59c. Connected between the anode and the positive conductor 53 is a winding 60. It may be a control winding such for example as the control winding of an electromagnetically operated device, the control field winding of a dynamoelectric machine or the saturation control winding of a magnetic amplifier. The control electrode 59c is connected to the junction point of the resistors 57 and 58 and thus is responsive to variations of voltage or current of the output circuit of the first stage.

Between the junction point 57a of resistors 57 and 58 and the control electrode 55c of the first stage valve is connected a degenerative feedback circuit in which an adjustable resistor 61 and a fixed resistor 62 are connected in series relationship. The adjustable resistor 61 corresponds to the adjustable resistor 9 in the Fig. 1 modification. A pair of adjustable resistors 63 and 64 are connected in series relationship across the positive and negative supply conductors 52 and 54. These resistors correspond to the adjustable resistors 14 and 20 of the Fig. 1 modification.

The anode 65a of a diode electric valve 65 is connected to the junction point of resistors 61 and 62 and the cathode 65b is connected to the sliding contact 63a of adjustable resistor 63. The anode 66a of a second diode electric valve 66 is connected to the sliding contact 64a of adjustable resistor 64 and the cathode 66b is connected to the junction point of the resistors 61 and 62 in the degenerative feedback circuit.

The variable error or input voltage is supplied across a voltage divider comprising resistors 67 and 68 connected in series relationship and to the junction point of which the control electrode 55c of the first stage valve is connected.

If neither diode valve 65 or 66 is conducting, the output of the first stage of the amplifier is fed back degeneratively through resistors 61 and 62 to the input or control electrode 55c and thus the gain of the amplifier is greatly reduced in proportion to the effectiveness of the feedback as determined by the adjustment of resistor 61 in the feedback circuit. At a predetermined positive value of first stage voltage at junction point 57a of resistors 57 and 58, which value is determined by the position sliding contact 63a of adjustable resistor 64, the diode 65 becomes conducting and the effect of the degenerative feedback on the gain of the amplifier is substantially eliminated so that the gain of the amplifier is restored to the normal value which it has in the absence of any feedback. At a predetermined value of negative voltage of point 57a of the first stage output with respect to the voltage of the sliding contact 64a, the diode valve 66 becomes conducting and eliminates the effect of the degenerative feedback. The exact points at which the transition from the region of relatively low gain to the region of relatively high gain takes place depends upon the adjustments of resistors 63 and 64.

Although in accordance with the provisions of the patent statutes this invention has been described as embodied in concrete form and the principle of the invention has been explained together with a best mode in which it is now contemplated applying that principle, it will be understood that the apparatus shown and described is merely illustrative and that the invention is not limited thereto since alterations and modifications will readily suggest themselves to persons skilled in the art without departing from the true spirit of this invention or from the scope of the annexed claims.

What we claim as new and desire to secure by Letters Patent of the United States is:

1. For use in a regulating system, an amplifying device provided with an output circuit, an input circuit for controlling the magnitude of an electrical quantity of said output circuit and a feedback circuit degeneratively coupling said output circuit and said input circuit, and means for effecting a relatively low gain between an electrical quantity of said input circuit and an electrical quantity of said output circuit over a predetermined range of relatively low values of said quantities and a relatively high gain over an adjoining range of values comprising a source of reference voltage, a connection from a point in said feedback circuit to a point of said reference voltage source and a blocking rectifier included in said connection for limiting the voltage of said point in said feedback circuit approximately to the value of the voltage of said point of said source.

2. In a regulating system, an amplifying device provided with an output circuit, an input circuit for controlling the magnitude of an electrical quantity of said output circuit, means for effecting a relatively low gain between an electrical quantity of said input circuit and an electrical quantity of said output circuit throughout a first range of relatively low values of said quantities comprising a feedback circuit degeneratively coupling said output circuit and said input circuit and means for effecting a relatively high gain between said input and output quantities throughout an adjoining range of relatively high values of said quantities comprising a source of reference voltage, connections from first and second points in said feedback circuit to corresponding points of said source and a rectifier included in the connection from said second point of its said corresponding point for limiting the voltage of said second point approximately to the value of the voltage of its said corresponding point of said source.

3. For use in a regulating system, an amplifying device provided with a load circuit and an input circuit for controlling the magnitude of an electrical quantity of said load circuit, a feedback circuit degeneratively coupling said input circuit to said output circuit for effecting a relatively low gain between an electrical quantity of said input circuit and said electrical quantity of said output circuit throughout a range of relatively low values of said quantities, and means for effecting a relatively high gain between said input circuit and output circuit quantities throughout an adjoining range of relatively higher values of said quantities comprising a source of reference voltage, a first connection from a first point in said feedback circuit to a corresponding point of said source and a second connection from a second point in said feedback circuit to a corresponding point of said source and a rectifier in said second connection poled to become conducting in response to a predetermined difference in the voltages of said second point and its said corresponding point thereby to limit the value of the voltage of said second point approximately to the value of the voltage of said corresponding point.

4. For use in a regulating system, an electrical translating device provided with an output circuit and an input circuit for controlling an electrical quantity of said output circuit, a feedback circuit degeneratively coupling said output circuit to said input circuit for effecting a relatively low proportion between the voltage of said input circuit and said controlled quantity throughout a predetermined range of values of said input voltage and said controlled quantity, and means for effecting a relatively high proportion between said input circuit voltage and output circuit electrical quantity throughout an adjoining range of values comprising a current limiting device responsive to the amount of current in said feedback circuit corresponding to the maximum value of said first range of values for limiting the current in a portion of said feedback circuit to said amount.

5. For use in a regulating system, an electrical translating device provided with an output circuit and an input circuit for controlling an electrical quantity of said output circuit, a degenerative feedback circuit from said output circuit to said input circuit for effecting a relatively low gain between the voltage of said input circuit and said controlled quantity over a predetermined range of values of said input voltage and said controlled quantity, and means for effecting a relatively high gain between said voltage and controlled quantity over a continuous range of values comprising means responsive to the value of the voltage of a point in said feedback circuit which value corresponds to the maximum values of said first range of values for limiting said feedback current to said corresponding value.

6. In a regulating system, an amplifying device provided with a load circuit, an input circuit for controlling the magnitude of an electrical quantity of said load circuit, means for effecting a relatively low gain between an electrical quantity of said input circuit and an electrical quantity of said output circuit throughout a first range of relatively low values of said quantities, means for effecting a relatively high gain between said input and output quantities throughout an adjoining range of relatively high values of said quantities comprising a source of reference voltage, connections from first and second points in said degenerative circuit to corresponding points of said source and a rectifier included in the connection from said second point to its said corresponding point for limiting the voltage of said second point approximately to the value of the voltage of its said corresponding point of said source, an adjustable resistor in said degenerative circuit for adjusting the gain between said input circuit and output circuit quantities, and means for adjusting the magnitude of said reference voltage thereby to adjust the extent of said first range of values of said quantities.

7. For use in a regulating system, an amplifying device having an output circuit, an input circuit including a control winding for controlling the magnitude of an electrical quantity of said output circuit, means for effecting a relatively low gain between an electrical quantity of said input circuit and an electrical quantity of said output circuit throughout a first range of relatively low values of said quantities comprising a degenerative feedback circuit from said output circuit to said input circuit including a degenerative control winding poled to oppose said control winding, and means for effecting a relatively high gain between said input circuit and output circuit quantities throughout an adjoining range of relatively higher values of said quantities comprising a source of reference voltage, connections from the terminals of said degenerative winding to points of said source for opposing the voltage drop of said degenerative field winding to the voltage of said source, and a rectifier included in one of said connections poled to become conducting when the voltage drop of said degenerative winding exceeds said reference voltage thereby to limit the current in said degenerative winding to a value corresponding to the magnitude of said reference voltage.

8. For use in a regulating system, an amplifying device comprising a dynamoelectric machine having a load circuit and a control field winding for controlling the magnitude of an electrical quantity of said load circuit, means for effecting a relatively low gain between an electrical quantity of said input circuit and said electrical quantity of said load circuit throughout a first range of relatively low values of said quantities comprising a degenerative circuit supplied from said output circuit and including a degenerative field winding poled to oppose said control field winding, and means for effecting a relatively high gain between said input circuit and output circuit quantities throughout an adjoining range of relatively higher values of said quantities comprising a source of reference voltage, connections from the terminals of said degenerative field winding to points of said source for opposing the voltage drop of said field winding to said reference voltage, and a rectifier included in one of said connections poled to become conducting when the voltage drop of said degenerative field winding exceeds said reference voltage thereby to limit the current in said degenerative winding to a value corresponding to the magnitude of said reference voltage.

9. For use in a regulating system, a magnetic amplifier having a load circuit including a main reactance winding and an input circuit including a direct current saturating winding for controlling the magnitude of an electrical quantity of said load circuit, means for effecting a relatively low gain between an electrical quantity of said input circuit and said controlled electrical quantity of said load circuit throughout a first range of relatively low values of said quantities comprising a degenerative circuit supplied from said output circuit and including a degenerative control winding poled to oppose said saturating control winding, and means for effecting a relatively high gain between said input circuit and output circuit quantities throughout an adjoining range of relatively higher values of said quantities comprising a source of reference voltage, connections from the terminals of said degenerative field winding to points of said source for opposing the votlage drop of said degenerative field winding to said reference voltage, and a rectifier included in one of said connections poled to become conducting when said voltage drop exceeds said reference voltage thereby to limit the current in said degenerative winding to a value corresponding to the magnitude of said reference voltage.

10. For use in a regulating system, a magnetic amplifier having a load circuit including a main reactance winding, a saturating control winding for controlling the magnitude of an electrical quantity of said load circuit and a full wave rectifier bridge connected to rectify the output voltage of said load circuit, means for effecting a relatively low gain between an electrical quantity of said input circuit and said controlled electrical quantity of said load circuit over a first range of relatively low values of said quantities comprising a degenerative feedback circuit supplied from the output terminals of said rectifier including a degenerative control winding poled to oppose said control winding, means for effecting a relatively high gain between said input and load circuit quantities throughout an adjoining range of relatively higher values of said quantities comprising a source of reference voltage, connections from the terminals of said degenerative winding to corresponding points of said source for opposing the voltage drop across said degenerative field winding to said reference voltage and a rectifier included in one of said connections poled to become conducting when the voltage drop of said degenerative winding exceeds said reference voltage thereby to limit the current in said degenerative winding to a value corresponding to the magnitude of said reference voltage, means for adjusting the magnitude of said reference voltage thereby to adjust the extent of said first range, and an adjustable resistor connected in series in said degenerative feedback circuit for adjusting the gain of said amplifier in said first range.

11. For use in a regulating system, an amplifying device comprising an electric valve having an anode, a cathode, and a control electrode, an output circuit including said anode and cathode, an input circuit including said control electrode and cathode for controlling the magnitude of an electrical quantity of said output circuit, means for effecting a relatively low gain between an electrical quantity of said input circuit and an electrical quantity of said output circuit throughout a first range of relatively low values of said quantities comprising a degenerative feedback, circuit connection from said output circuit to said input circuit and means for effecting a relatively high gain between said input and output quantities throughout an adjoining range of relatively high values of said quantities comprising a source of reference voltage, a connection from a point in said degenerative feedback circuit to a point of said reference voltage source and a blocking rectifier included in said connection for limiting the voltage of said point in said degenerative circuit approximately to the value of the voltage of said point of said reference voltage circuit.

12. For use in a regulating system, an amplifying device comprising an electric valve having an anode, a cathode, and a control electrode, an output circuit including said anode and cathode, an input circuit including said control electrode and cathode for controlling the magnitude of an electrical quantity of said output circuit, means for effecting a relatively low gain between an electrical quantity of said input circuit and an electrical quantity of said output circuit throughout a first range of relatively low values of said quantities comprising a degenerative feedback, circuit connection from said output circuit to said input circuit and means for effecting a relatively high gain between said input and output quantities throughout an adjoining range of relatively high positive values of said quantities and throughout a second adjoining range of relatively high negative values of said quantities comprising a source of reference voltage, first and second connections from a point on said degenerative feedback connection to points on said source of positive and negative voltage with respect to the voltage of said cathode, and a rectifier included in said first connection and an oppositely poled rectifier included in said second connection for limiting the maximum positive and negative voltage of said point on said degenerative feedback connection to the positive and negative values of said points positive and negative voltages of said reference voltage source.

No references cited.